United States Patent [19]

Doerges et al.

[11] 4,368,059
[45] Jan. 11, 1983

[54] PROCESS OF REMOVING $H_2S$, $CO_2$, COS AND MERCAPTANS FROM GASES BY ABSORPTION

[75] Inventors: Alexander Doerges; Manfred Kriebel; Johann Schlauer, all of Frankfurt am Main, Fed. Rep. of Germany

[73] Assignee: Metallgesellschaft Aktiengesellschaft, Frankfurt am Main, Fed. Rep. of Germany

[21] Appl. No.: 220,345

[22] Filed: Dec. 29, 1980

[30] Foreign Application Priority Data

Jan. 5, 1980 [DE] Fed. Rep. of Germany ....... 3000250

[51] Int. Cl.³ .............................................. B01D 53/14
[52] U.S. Cl. ........................................ 55/73; 423/228
[58] Field of Search ...................... 55/68, 73; 423/223, 423/226–229

[56] References Cited

U.S. PATENT DOCUMENTS

| | | | |
|---|---|---|---|
| 3,463,603 | 8/1969 | Freitas et al. | 55/73 X |
| 3,653,809 | 4/1972 | Wehner et al. | 55/73 X |
| 3,653,810 | 4/1972 | Bratzler et al. | 423/229 |
| 3,965,244 | 6/1976 | Sykes, Jr. | 423/226 X |
| 3,989,811 | 11/1976 | Hill | 55/73 X |
| 4,041,131 | 8/1977 | Forbes | 55/73 X |
| 4,044,100 | 8/1977 | McElroy, Jr. | 423/226 |
| 4,137,294 | 1/1979 | Braizler et al. | 423/226 X |
| 4,250,150 | 2/1981 | Karwat et al. | 55/73 X |
| 4,259,301 | 3/1981 | Say | 55/73 X |

FOREIGN PATENT DOCUMENTS 1815137  7/1976  Fed. Rep. of Germany .

Primary Examiner—Robert H. Spitzer
Attorney, Agent, or Firm—Sprung, Horn, Kramer & Woods

[57] ABSTRACT

The process of removing $H_2S$, $CO_2$, COS and mercaptans from gases by absorption in an absorbent solution, which is circulated between the absorbing zone and a regenerating zone and which contains at least one organic base dissolved in methanol, has been improved. In accordance with the invention, the absorbent solution contains one or more secondary or tertiary amines general formula $R_1$—NH—$R_2$ or $(R_1)_2$—N—CH$_2$—N—$(R_2)_2$, wherein $R_1$ and $R_2$ means $CH_2$— or —$CH_2$—$CH_3$ or $CH_3$—CH—$CH_3$ in a total amount of at least 0.5 to 5.0 moles per liter, and the amine has or the amines have a boiling point between 40° and 110° C. at 1 bar. This improvement permits a selective removal of $H_2S$ from $CO_2$-containing gases.

9 Claims, 1 Drawing Figure

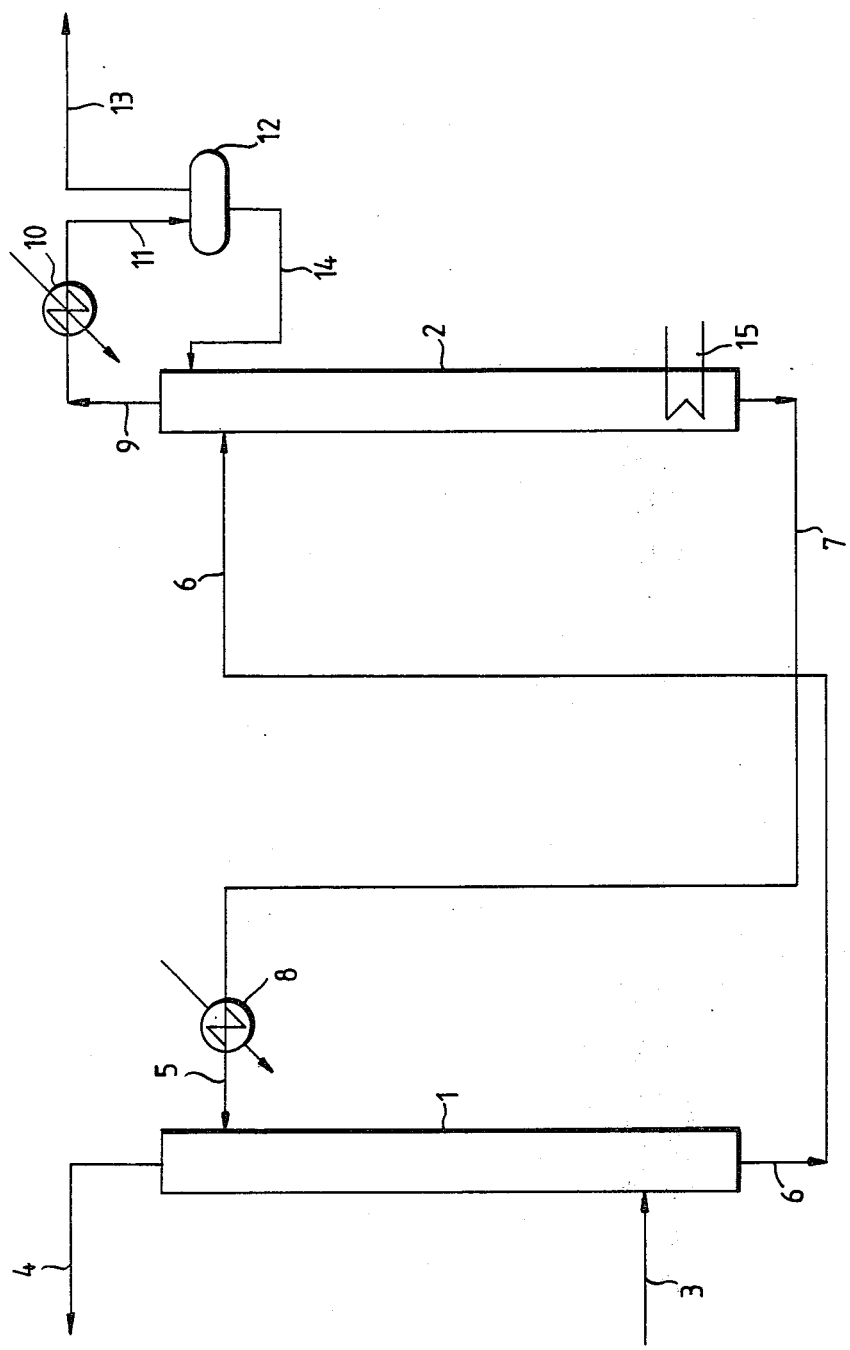

PROCESS OF REMOVING H₂S, CO₂, COS AND MERCAPTANS FROM GASES BY ABSORPTION

BACKGROUND OF THE INVENTION

1. Field of the Invention

This invention relates to a process of removing $H_2S$, $CO_2$, COS and mercaptans from gases by absorption in an absorbent solution which is circulated between an absorbing zone and a regenerating zone and contains at least one organic base in an organic solvent in which the gaseous constituents to be removed are physically soluble, wherein the absorption is effected under a pressure of 1 to 180 bars and at temperatures of 5° to 80° C.

2. Discussion of Prior Art

Before natural gases or gases produced by the gasification of carbonaceous substances are used, the acid or sulfur-containing constituents of the gases must be removed. This is preferably effected by scrubbing the gases with suitable absorbent solutions. Particularly if such gases are to be used in catalytic reactions, such as the synthesis of methanol, only very low residual contents of sulfur compounds are often permissible if a deterioration of the catalysts is to be avoided. It is particularly difficult to remove carbon oxysulfide (COS), because it has only a low reactivity at normal temperatures and has a low solubility in the usual physically acting organic solvents, such as methanol. For this reason, relatively large quantities of the absorbent solution are required for removing the sulfur compounds, particularly COS, to a high degree. This involves a relatively high expenditure for equipment and supplies, such as electric power and steam.

It is known that the absorption of acid gases and organic sulfur compounds, e.g., in methanol, can be improved in that 0.2 to 4 moles/liter of an ethanolamine is added to the methanol (German Pat. No. 1,815,137). But this results in undesired secondary reactions of the ethanolamines with formation of compounds which cannot be thermally regenerated. These byproducts must be removed from the absorbent solution with an additional expenditure, e.g., as distillation residue, if a constant scrubbing action is to be maintained and corrosion is to be avoided.

It is an object of the invention to avoid these and other disadvantages of the prior art.

SUMMARY OF INVENTION

This object is accomplished according to the invention in that the absorbent solution used to remove $H_2S$, $CO_2$, COS and mercaptans from gases which contain these constituents contains one or more secondary or tertiary amines of the general formula $R_1$—NH—$R_2$ or $(R_1)_2$—N—$CH_2$—N—$(R_2)_2$, wherein $R_1$ and $R_2$ mean $CH_3$ or $CH_2CH_3$ or $CH_3$—CH—$CH_3$ in a total amount of 0.5 to 5.0 moles per liter, and the amine has or the amines have a boiling point between 40° and 110° C. at 1 bar.

"A total of 0.5 to 5.0 moles per liter" means that the total of all amines defined above which are contained in one liter of absorbent solution shall amount to 0.5 to 5.0 moles.

The secondary and tertiary amines of the general formula $R_1$—NH—$R_2$ or $(R_1)_2$—N—$CH_2$—N—$(R_1)_2$, wherein $R_1$ and $R_2$ mean $CH_3$— or —$CH_2$—$CH_3$ or $CH_3$—CH—$CH_3$ include, inter alia, the following aliphatic alkylamines. Diethylamine $CH_3CH_2NHCH_2CH_3$, methylisopropylamine $CH_3NHCH(CH_3)_2$, ethylisopropylamine $CH_3CH_2NHCH(CH_3)_2$, diisopropylamine $(CH_3)_2CHNHCH(CH_3)_2$, bis-(dimethylamino)-methane $(CH_3)_2NCH_2N(CH_3)_2$, (dimethylamino) (diethylamino)methane $(CH_3)_2NCH_2N(CH_2(CH_2CH_3))_2$.

It is apparent that $R_1$ and $R_2$ may be identical or different within the scope of the invention. Diisopropylamine or bis-dimethylaminomethane are preferentially used as amines in accordance with the invention.

The organic solvents which are suitable include all conventional solvents which do not irreversibly react with the gaseous constituents and which can be regenerated by being heated or boiled out at about 1 bar. Particularly suitable solvents are univalent alcohols, such as methanol, ethanol, propanol, isopropanol. N-alkylated pyrrolidones and piperidones and lactams such as N-methylpyrrolidone and N-methylepsilon-caprolactam, are also suitable, also dialkylglycolethers. The solvent may contain or take up water. Methanol is preferentially used as organic solvent.

In a preferred embodiment of the invention, methanol is used as an organic solvent, methanol and amine are jointly backwashed with water from the scrubbed gases and/or the exhaust gases from the regeneration, and methanol and amine are distilled from the methanol-amine-water mixture and are recycled to the circulating absorbent solution.

According to a preferred further feature of the invention all of the $H_2S$ content and simultaneously at most 60% of the $CO_2$ content are removed from the gas in a first absorbing zone and the remaining $CO_2$ is removed from the gas in a second absorbing zone.

The absorbent solution used in carrying out the process according to the invention contains per liter one or more secondary or tertiary amines of the general formula $R_1$—NH—$R_2$ or $(R_1)_2$—N—$CH_2$—N—$(R_2)_2$, wherein $R_1$ and $R_2$ mean $CH_3$ or $CH_2$—$CH_3$ or $CH_3$—CH—$CH_3$ in a total amount of 0.5 to 5.0 moles per liter, and the amine has or the amines have a boiling point between 40° and 110° C. at 1 bar.

$R_2$ may be identical to $R_1$. The amine contained in the absorbent solution according to the invention is preferably diisopropylamine. Bis-dimethylamino-methane may also be used.

Methanol has proved particularly satisfactory as an organic solvent in the absorbent solution used according to the invention. A special advantage afforded by the absorbent solution composed according to the invention resides in that it removes $H_2S$ in preference to $CO_2$, i.e., it is selective for $H_2S$. An absorbent solution is regarded as selective for $H_2S$ if the volume ratio $H_2S:CO_2$ is higher in the absorbed part of the gas, i.e., in the exhaust gas from the regeneration, than in the gas before the absorption. This property of the absorbent solution will be of economical significance, particularly if the $H_2S:CO_2$ ratio in the gas to be purified is low and the absorbed part of the gas should be processed in a concentrated form to produce sulfur or sulfuric acid.

BRIEF DESCRIPTION OF DRAWING

The advantageous properties of the process according to the invention and of the proposed absorbent solutions will be explained further in the drawing which is a flow diagram showing a mode of carrying out the invention and in the following examples.

Table 1 below represents the results of comparative tests regarding the absorption capacity for gaseous $CO_2$ at a given temperature

TABLE 1

| $CO_2$ partial pressure (bars) | State of the Art Solution 1 Moles $CO_2$/ mole amine | Invention Solution 2 Moles $CO_2$/ mole amine | Invention Solution 3 Moles $CO_2$/ mole amine |
| --- | --- | --- | --- |
| 0.1 | 0.49 | 0.79 | 1.40 |
| 0.2 | 0.53 | 0.88 | 1.55 |
| 0.4 | 0.59 | 0.93 | 1.67 |
| 0.6 | 0.63 | 0.94 | 1.72 |
| 0.8 | 0.67 | 0.95 | 1.75 |
| 1.0 | 0.70 | 0.96 | 1.77 |

In accordance with the state of the art, solution 1 contains monoethanolamine in methanol. Solution 2 contains, in accordance with the invention, diisopropylamine in methanol. Solution 3 contains, also in accordance with the invention, bis-dimethylaminomethane in methanol. It is apparent that the solutions according to the invention can absorb much more $CO_2$ relative to the amine content than the solution according to the state of the art.

As a result, for a given amine content, the quantity of circulated absorption solution required to absorb a given quantity of $CO_2$ is much smaller.

Table 2 indicates the solubilities of carbon oxysulfide COS in four different solutions: in methanol without an additive and in solutions of various additives in methanol.

TABLE 2

| State of the Art Solution | Relative solubility of COS | Invention Solution | Relative solubility of COS |
| --- | --- | --- | --- |
| Methanol without amine | 1 | Diisopropylamine in methanol | 6 |
| Diethanolamine in methanol | 5 | Bis-dimethylamino-methane in methanol | 6 |

The solubility of COS has been stated in relative values measured at room temperature and for the same molar concentrations of amine. The solubility in methanol containing no amine has been regarded as unity. The values have been ascertained for a $CO_2$ partial pressure of 0.4 bar, i.e., for a partly neutralized amine.

The table shows that the solubility of COS is improved even by an addition of diethanolamine.

The relative solubility is even higher in the absorption solutions which in accordance with the invention contain diisopropylamine or bis-dimethylaminomethane.

In additional tests (see Table 3) it has been found that carbon steel (boiler plate) will not be attacked in the absorbent solutions according to the invention in the presence of acid gases, such as $CO_2$ and $H_2S$. Various solutions were heated to boil in glass vessels under reflux in the presence of $CO_2$ (tests 1 to 3) and of $CO_2$ with 1% by volume $H_2S$ (test 4). Specimen plates of iron were disposed in the liquid phase and partly in the gas phase. The weight losses stated and the observations made after considerable time have been compiled in Table 3.

TABLE 3

| Test No. | State of the Art 1 | State of the Art 2 | Invention 3 | Invention 4 |
| --- | --- | --- | --- | --- |
| Solvent | water | methanol | methanol | methanol |
| Amine | MEA | MEA | DIPAM | DIPAM |
| Duration (hours) | 64 | 112 | 286 | 743 |
| Weight loss g/m² day | 0.4 | 0.1 | 0 | 0 |
| Deposit | strong | yes | no | no |

(MEA = monoethanolamine; DIPAM = diisopropylamine)

This shows that iron was definitely attacked in solutions 1 and 2, which contained MEA. The solution used in tests 3 and 4 consisted of the absorbent solution according to the invention. It contained diisopropylamine and had no corrosive activity at all.

DESCRIPTION OF PROCESS

The invention will now be explained by way of example with reference to the drawing.

The plant which is diagrammatically indicated in the drawing consists of an absorbing zone 1 and a regenerating zone 2. The coolers 8 and 10, a heater 15 and a separating vessel 12, which are essential for the invention, are shown too. Details which are required for heat economy, handling of fluids and control have been omitted for the sake of clarity. The gas to be treated enters the absorbing zone 1 through a duct 3. The absorbing zone may consist as usual of a plate column or packed column and is flown through by the gas from bottom to top. The treated gas leaves the plant through duct 4.

The absorbent solution according to the invention is supplied through conduit 5 to the top end of the absorbing zone 1 and flows through the latter from top to bottom in a countercurrent to the gas. The solution is withdrawn through conduit 6 and then contains as solutes the gaseous constituents absorbed from the gas. The solution reaches the regenerating zone 2, which consists as usual of a plate column or packed column and is flown through by the solution from top to bottom. The solution is indirectly heated in the lower part of the regenerating zone by the heater 15 and is thus partly evaporated. The vapors rise in a countercurrent to the absorbent solution and heat the latter and strip the gaseous constituents which have been absorbed in the absorbing zone 1. Part of the vapors is condensed in this step. The remaining vapors and the stripped gaseous constituents are withdrawn through duct 9. They are cooled in the indirect cooler 10, which is supplied, e.g., with water and in which the condensible constituents are liquefied. These constituents just as the remaining gaseous constituents flow in conduit 11 into the separating vessel 12, from which the condensate is refluxed in conduit 14 to the upper part of the regenerating zone 2 whereas the gases are withdrawn through duct 13.

The regenerated absorbent solution which has been freed from the absorbed gaseous constituents is withdrawn from the regenerating zone through conduit 7 and is cooled, e.g., by cooling water, in the indirect cooler 8, and re-enters the absorbing zone 1 through conduit 5.

The invention will be explained further in the following examples.

EXAMPLE 1

In a plant which embodies at least the features shown in the drawing explained hereinbefore, a gas containing 5.0% by volume $CO_2$, 0.8% by volume $H_2S$, 0.05% by volume COS, balance CO and $H_2$ (at this juncture and hereinafter, the volume of a gas is stated in $m^3$ measured at 0° C. and 1.013 bars) is fed at a rate of 10,000 $m^3$ under a pressure of 50 bars and at a temperature of 25° C. to the absorbing zone 1 in duct 3. An absorbent solution which per liter contains 1.5 mole diisopropylamine dissolved in methanol and is at 25° C. enters at a rate of 17 $m^3$/h through conduit 5 into the absorbing zone at its top end. This absorbent solution composed in accordance with the invention is used for a countercurrent scrubbing of the gas. The purified gas withdrawn through duct 4 at a rate of 9400 $m^3$/h is at 35° C. and per $m^3$ contains less than 0.1 mg sulfur in the form of $H_2S$ and COS as well as 0.0005% by volume $CO_2$, balance CO and $H_2$. Small quantities of methanol and amine taken up from the absorbent solution can easily be removed in known manner so that the gas can subsequently be fed to a plant for alcohol synthesis.

Gas consisting of $CO_2$, $H_2S$, COS and some CO and $H_2$ is absorbed at a rate of 600 $m^3$/h by the solution in the absorbing zone 1. 1.03 moles $CO_2$ are absorbed per mole of amine. Hereby, the absorbent solution is heated to 54° C. At this temperature the solution flows through conduit 6 to the regenerating zone 2. The latter consists of a conventional regenerating column and is operated under an absolute pressure of 1.5 bars at its top end.

The absorbent solution is flashed as it enters that regenerating column and as it trickles down therein is heated and stripped by the vapors rising from the lower portion of the column. The gaseous constituents absorbed in the absorbing zone 1 are thus transferred to the gas phase. The indirect heater 15 in the lower portion of the regenerating column heats the absorbent solution to its boiling temperature, which is 80° C. at the prevailing pressure, and causes the rising vapors to be generated. The regenerated absorbent solution leaves the regenerating zone through conduit 7 and is cooled in the indirect cooler 8 and refed through the conduit 5 to the absorbing zone 1.

The gases and vapors which have been flashed off and stripped leave the regenerating zone through the conduit 9. They are cooled to 22° C. in the indirect cooler 10, in which methanol and amine are thus condensed and bind part of the $CO_2$ and $H_2S$. The remaining gas and the condensate are fed through conduit 11 to the separating vessel 12, from which the separated condensate is refluxed in conduit 14 to the top of the regenerating column. 600 $m^3$/h gases consisting of 83.3% by volume $CO_2$, 13.3% by volume $H_2S$, 0.8% by volume COS, 2.5% by volume $CO+H_2$ and some vapors of methanol and amine exit through duct 13. From these gases, methanol and amine can easily be recovered in known manner whereas the remaining gas can be processed to form sulfuric acid.

In this process there is no need for expensive heat exchangers for the absorbent solution fed to the regenerating zone because the difference between the temperatures in the absorbing zone and the regenerating zone is small. Only the regenerated absorbent solution must be cooled before it is used in the absorbing zone. Because the absorbent solution and its constituents are not corrosive and the temperatures are low, the illustrated plant may be built from steel without using expensive materials which resist corrosion. The heat requirement of the regenerating zone is low because the circulating absorbent solution amounts only to 1.7 $m^3$ per 1000 $m^3$ of gas to be treated and because the regenerating temperature is low and rising stripping vapors in the regenerating zone is required only at a low rate.

As the temperature is low, low-pressure steam or hot water, e.g., water condensed from steam, can be used in the indirect heater 15. There is no need for an apparatus for processing the absorbent solution to remove high-boiling by-products which have been derived from constituents of the absorbing solution and cannot be thermally regenerated.

Comparison Test

Gas at the same rate is treated under the same initial conditions with an absorbent solution according to the prior art as disclosed in German Pat. No. 18 15 137. That absorbent solution consists of a mixture of a primary aliphatic alcohol, ethanolamines and water, namely 3.0 moles of diethanolamine per liter of a mixture of methanol with 10% by weight of water. That mixture is required at a rate of 22 $m^3$/h to purify gas at a rate of 10,000 $m^3$/h to the same low residual contents of $H_2S$ and COS and to remove all $CO_2$ too. This shows that the rate at which absorbent solution is circulated is 29% higher although the solution contains twice as much amine, and the $CO_2+H_2S+COS$ contents amount to only 0.40 mole per mole of amine. The heat requirement in the regenerating zone is 50% higher than in Example 1 and apparatus for separating non-regenerable by-products is required, which consumes additional energy.

EXAMPLE 2

In a plant which embodies at least the features shown in the drawing, a gas which contains 5.2% $CO_2$, 1.2% by volume $H_2S$, residual CO and $H_2$ is fed at a rate of 50,000 $m^3$/h and under a pressure of 51 bars and at a temperature of 27° C. through duct 3 to the absorbing zone 1. An absorbent solution consisting of 1.5 moles diisopropylamine per liter and methanol enters through conduit 5 the top end of the absorbing zone at a rate of 50 $m^3$/h and at a temperature of 26° C. The absorbent solution absorbs all of the $H_2S$ and 47% of the $CO_2$ contained in the gas. The exiting scrubbed gas contains less than 1 mg $H_2S/m^3$ and still contains 2.9% by volume $CO_2$. The gas is used for methanol synthesis.

When the gas is to be used for other purposes, the residual $CO_2$ can also be entirely scrubbed out of the scrubbed gas in a second absorbing zone, which is also operated with an absorbent solution according to the invention. From the appropriate second regenerating zone a $CO_2$ gas is obtained which is entirely free from sulfur compounds and may be used e.g. for synthesis purposes.

The laden absorbent solution, in which 1220 $m^3$ $CO_2$, 600 $m^3$ $H_2S$ and some CO and $H_2$ are dissolved, is fed to the regenerating zone 2. The stripped gases are withdrawn in conduit 13 and can be treated in known manner to backwash amine traces. Thereafter, the gases contain mainly 31.2% by volume $H_2S$ and 63.5% by volume $CO_2$ and may be processed in conventional manner in a Claus process plant to produce sulfur. In this example, 100% of the $H_2S$ and 47% of the $CO_2$ are scrubbed from the gas.

This Example 2 shows the use of an absorbent solution according to the invention for the selective removal of hydrogen sulfide from $CO_2$-containing gases with production of a regenerating zone exhaust gas in which the volume ratio of hydrogen sulfide to $CO_2$ is higher than in the gas to be scrubbed.

Generally the process is conducted at a pressure of 0.987 to 177.6 atmospheres absolute, preferably 20 to 100 atmospheres absolute (1 bar=0.987 atm).

The absorption is generally effected at a temperature of 5° to 80° C., especially 20° to 65° C.

The gaseous components $CH_2S$, $CO_2$, COS and mercaptans can be removed from gases which contain major amounts of other components, such as any of the following mixtures thereof: $H_2+CO$, $H_2+N_2$, $H_2+CO+N_2$, $CO+N_2$, $CH_4+C_2+H_6$, $H_2+CH_4$, $CO+CH_4$, $H_2+CO+CH_4$.

What is claimed is:

1. In a process for removing $H_2S$, $CO_2$, COS or mercaptans from a gas containing the same by absorption in an absorbent solution which is circulated between an absorbing zone and a regenerating zone and contains at least one organic base in an organic solvent in which the gaseous constituents to be removed are physically soluble, wherein the absorption is effected under a pressure of 1 to 180 bars and at temperatures of 5° to 80° C., the improvement wherein the absorbent solution used to remove $H_2S$, $CO_2$, COS and/or mercaptans from gases which contain the same contains one or more secondary or tertiary amines of the general formula $R_1$—NH—$R_2$ or $(R_1)_2$—N—$CH_2$—N—$(R_2)_2$, wherein $R_1$ and $R_2$ mean $CH_3$— or —$CH_2$—$CH_3$ or $CH_3$—CH—$CH_3$ in a total amount of 0.5 to 5.0 moles per liter, and the amine has or the amines have a boiling point between 40° and 110° C. at 1 bar.

2. A process according to claim 1, wherein said gas contains $H_2S$ and $CO_2$.

3. A process according to claim 1, wherein said gas contains $H_2S$, $CO_2$ and COS.

4. A process according to claim 1, wherein $R_2=R_1$.

5. A process according to claim 1, wherein the amine is diisopropylamine.

6. A process according to claim 1, wherein the amine is bis-dimethylaminomethane.

7. A process according to claim 1, wherein methanol is employed as the organic solvent.

8. A process according to claim 7, wherein methanol and amine are jointly backwashed with water from the scrubbed gases and/or the exhaust gases from the regeneration, and methanol and amine are distilled from the methanol-amine-water mixture and are recycled to the circulating absorbent solution.

9. A process according to claim 1, wherein the gas comprises $H_2S$ and $CO_2$ and substantially all of the $H_2S$ and at most 60% of the $CO_2$ content are simultaneously removed from the gas in a first absorbing zone and the remaining $CO_2$ is removed from the gas in a second absorbing zone.

* * * * *